United States Patent [19]

Thomas

[11] 3,920,918

[45] Nov. 18, 1975

[54] PULSE EDGE COINCIDENCE DETECTION CIRCUIT FOR DIGITAL DATA TRANSMISSION USING DIPHASE DATA SYNC

[75] Inventor: James Houghton Thomas, Bundoora, Australia

[73] Assignee: L.M. Ericsson Pty Lid., Broadmeadows, Australia

[22] Filed: June 6, 1974

[21] Appl. No.: 477,097

[52] U.S. Cl. ........... 179/15 BS; 178/69.5 R; 328/63
[51] Int. Cl.[2] ............................................ H04L 7/00
[58] Field of Search .................... 179/15 BS, 15 BF; 178/69.5 R

[56] References Cited

UNITED STATES PATENTS

| | | | |
|---|---|---|---|
| 3,593,160 | 7/1971 | Moore | 179/15 BS |
| 3,838,214 | 9/1974 | Lind | 178/69.5 R |

*Primary Examiner*—Kathleen H. Claffy
*Assistant Examiner*—E. S. Kemeny
*Attorney, Agent, or Firm*—Cushman, Darby & Cushman

[57] ABSTRACT

The invention relates to a synchronous digital data transmission system, for example, a digital PABX telephone system, and in particular to a circuit for detecting when a transition in digital data received at the switch or exchange from a remote telephone coincides with a transition of the local system clock and on detection of such a coincidence the circuit is adapted to provide appropriate compensation. In such a system some form of clock signal is transmitted from the switch to the remote phone with the outgoing data and therefore the timing of received signal depends on the timing of the outgoing data. The invention provides compensation to the outgoing signal and as a consequence only very simple circuitry is involved. A detection circuit comprising an exclusive OR gate and a D-type flip-flop receives the data from the phone and a specially derived strobe pulse which is related to the system clock. When a coincidence is detected the detection circuit provides an output to invert a clock signal which clocks the outgoing data thus introducing a delay equal to half the period of said clock. The circuit is locked in position to cause said delay unless a further transition coincidence occurs which can only happen under normal circumstances if the length of the line is altered.

8 Claims, 1 Drawing Figure

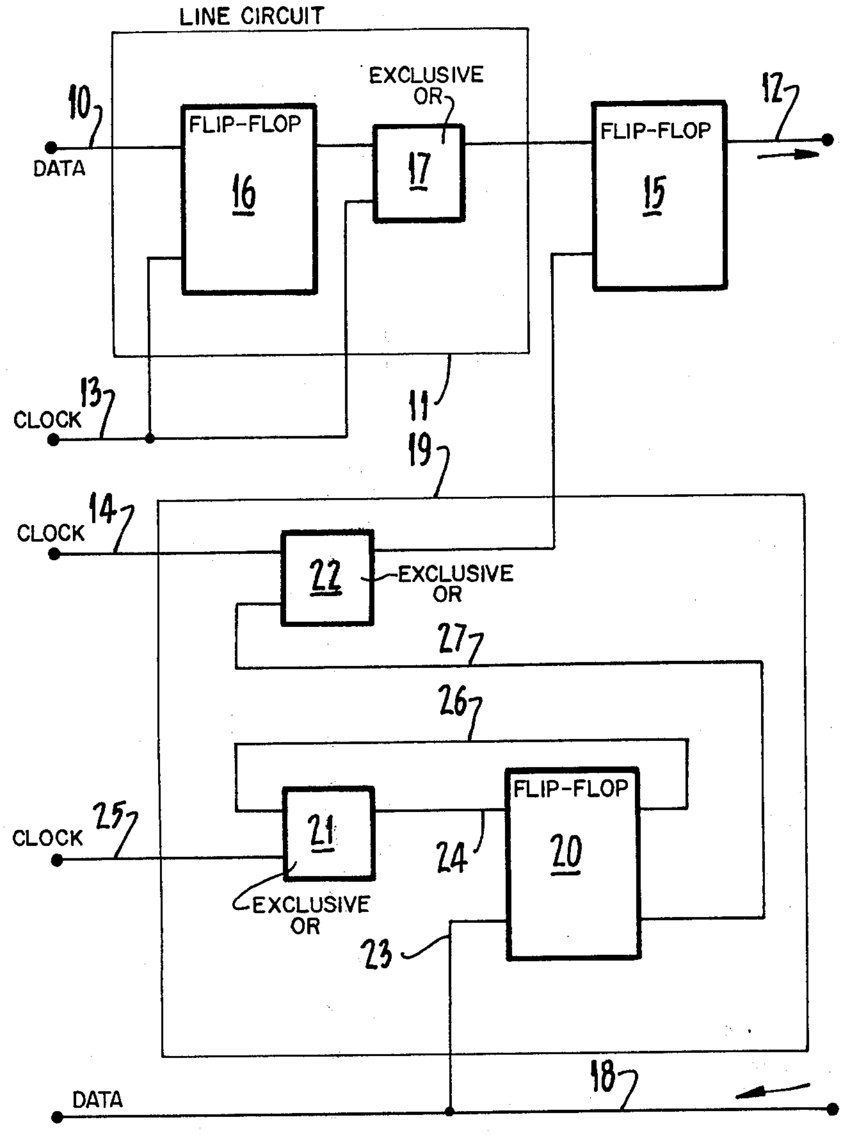
LINE CIRCUIT
10
DATA
FLIP-FLOP
16
EXCLUSIVE OR
17
FLIP-FLOP
15
12
CLOCK
13
11
19
CLOCK
14
22
EXCLUSIVE OR
27
26
FLIP-FLOP
CLOCK
25
21
24
20
EXCLUSIVE OR
23
DATA
18

PULSE EDGE COINCIDENCE DETECTION CIRCUIT FOR DIGITAL DATA TRANSMISSION USING DIPHASE DATA SYNC

This invention relates to digital data transmission systems and more particularly to a circuit for detecting and compensating for a coincidence of transitions in a digital data transmission system.

In a synchronous digital data system for example, a transition clash may occur when the propagation delay of data from a switch or exchange through the circuitry to a remote data terminal and back to the switch is approximately equal to or a multiple of the minimum period between transitions of the data. That is, data received at the switch from the remote terminal has transitions occuring substantially coincident with the transitions of the local clock. Such a transition clash means that data intended to be clocked into the switch is likely to be lost because all devices which store data by clocking have a requirement that the data be present (set up) for a given time before the clocking or latching occurs.

This problem has been appreciated and one known circuit for avoiding the situation detects when the transitions of the returned digital signal are close to those of the local clock and, on detection, delays the signal into the switch by means of a shift register on the receive side which is switched in by a logic circuit. However, the circuit necessary is relatively involved and considering it is desirable to have such circuitry on every line the cost involved in a large system is quite significant.

Furthermore, the circuit is only useful on those lines with a length which causes the undesirable propogation delay and even in such a case the circuit only activates on the initial use of the line to latch in position to cause the signal delay; unless of course the length of the line is subsequently altered. Therefore it is desirable to provide the circuit at minimal cost.

It is an object of this invention to provide an improved circuit for detecting and compensating for a transition clash which circuit is relatively simple in construction and thus economical in cost.

Accordingly, one broad form of the invention which may be preferred provides a transition coincidence detection and compensation circuit for a synchronous digital data transmission system wherein data is transmitted and received between a central system device and a remote terminal, said circuit comprising a circuit connected to detect transition coincidence between data received by the central device from the remote terminal and a local system clock and circuit means responsive to said circuit to delay said outgoing data from said device, upon which outgoing data the timing of said received data is dependant.

In order that the invention may be more clearly understood one particular embodiment will now be described with reference to the accompanying drawing. The embodiment relates to a synchronous digital telephone system transmitting diphased data at 64KHz repetition rate.

Data from a switch or exchange (not shown) of the system appears on connection 10 and passes through a line circuit 11 to provide a signal suitable for transmission to a telephone of the system on an outgoing line connection 12. The line circuit 11 is responsible for diphasing the data with a local clock signal which appears on connection 13. The line circuit 11 may take a number of different forms and does not form part of the present invention.

The diphased data is clocked onto the outgoing line at twice the normal data rate, that is, twice the normal system clock rate. The local clock rate on connection 13 is 64KHz in this embodiment and therefore the diphased data is clocked onto the outgoing line 12 at 128KHz. The 128 KHz clock is derived from the local system clock and appears on connection 14. The 128 KHz clock signal is fed to a *+ve* edge triggered device in the form of a D type flip-flop 15 for switching the data from the line circuit 11 onto the outgoing line 12. The line circuit 11 comprises a D type flip-flop 16 and an exclusive OR gate 17.

Data received by the switch or exchange from the remote telephone appears on incoming line connection 18 and is clocked into the switch every 15.6 μs by the 64KHz system clock. A transition coincidence detection and compensation circuit 19 is connected to the incoming line 18 and comprises a D type flip-flop 20 and exclusive OR gates 21 and 22. The flip-flop 20 is a *+ve* triggered device and its clock input 23 is connected to the incoming line 18. All *+ve* going transitions in the incoming data on connection 18 will cause the flip-flop 20 to clock through a signal appearing on its data input connection 24.

The signal on connection 24 is a special clock or strobe signal. The special clock or strobe signal may be derived directly from the system clock or it may be indirectly derived from the switch. The special clock is a pulse timed to be high at the input 24 to the D flip-flop 20 immediately before, during and after the switch input "hazard" time. The "hazard" time will depend on the switch input device used (the switch input device is not shown). A parallel load shift register for example could be used an an input device and may have a set up time of about 10ns whereas a low power D flip-flop which would also be suitable for use in the detection device may have a set up time of 30ns. Therefore to be sure of detecting any transition on the incoming line 18 which occurs during the 10ns hazard time the *+ve* going transition of the special clock signal would have to occur at the data input 24 to the flip-flop 20 at least 30ns before the commencement of the 10ns hazard period i.e. 40ns before the switch input clock changes state. The repetition rate of the special clock signal may be quite slow, and must be, at the fastest, equal to the 64KHz clock divided by a maximum number of bits delay around the phone circuit including the maximum resynchronising time for the phone clock extract circuitry. Theoretically the special clock signal on connection 24 need only occur once, that is, on the first use of the apparatus.

The special clock signal sppears on connection 25 and is supplied to the flip-flop 20 via the two input exclusive OR gate 21. The other input 26 of the exclusive OR gate is connected to the reset output of the flip-flop 20. The set output 27 of the flip-flop 20 is connected to one input of the other two input exclusive OR gate 22. The other input of the OR gate 22 receives the 128KHz clock signal on connection 14 mentioned above and the output of the OR gate 22 provides the clock signal for clocking the outgoing data onto the outgoing line 12.

In use the circuit operates as follows: All *+ve* going transitions of the data signal into the switch on connection 18 will cause the flip-flop 20 to clock through the signal appearing at its input 24. This signal is the special clock signal discussed above. Should this special clock signal be high when the flip-flop 20 is clocked by the +*ve* going transition in the incoming data then, assuming the flip-flop 20 was in the reset state i.e., the set or Q output 27 was equal to zero, the set output 27 will change state, that is Q becomes +*ve* or = 1 and the reset or $\overline{Q}$ output will go to zero. In the original or reset condition of the flip-flop 20, the true strobe signal will appear at the flip-flop data input 24, but, after the change of state it will be inverted because of the exclusive OR gate 21. The flip-flop 20 will change state again at the next occurence of a +*ve* transition in the incoming data coinciding with the special clock pulse. However, such a coincidence or clash is prevented by the exclusive OR gate 22, which inverts the 128KHz clock signal which clocks the +*ve* edge triggered device and causes the outgoing data to be delayed by 3.9 $\mu$s.

Therefore, the outgoing data to the phone on connection 12 is delayed by a further 3.9 $\mu$s. The telephone will now resynchronise to this data and after all propagation delays have been taken into account the data arriving back at the exchange will also be shifted by 3.9 $\mu$s. Thus a further clash can only occur if the propagation delay is altered, for example by altering the length of the line.

It should be apparent to persons skilled in the art from the above described embodiment that the present invention, by operating on the outgoing signal to cause a delay in the outgoing signal provides an improved clash detection circuit which requires less circuitry than the prior art devices. It should also be apparent that the invention may be applied to other forms of digital transmission wherein transition coincidence presents a problem. In other words any synchronous digital system requiring a system clock to be sent to remote terminal devices with the data may utilize the present invention to avoid loss of returned data due to coincidence between pulse edges of the returned data and the local system clock.

Also whilst the embodiment described detects a coincidence between the positive going edge of the returned data and the local clock it could readily be adapted to detect coincidence of the negative going edge merely be replacing the flip-flop 20 with a −*ve* edge triggered device.

I claim:

1. A transition coincidence detection and compensation circuit for a synchronous digital data transmission system wherein data is transmitted and received between a central system device and a remote terminal, said circuit comprising a circuit connected to detect transition coincidence between data received by the central device from the remote terminal and a local system clock and circuit means responsive to said circuit to delay said outgoing data from said device, upon which outgoing data the timing of said received data is dependent.

2. A transition coincidence detection and compensation circuit as defined in claim 1 wherein said circuit is adapted to provide an output when a transition of said received data occurs and a strobe pulse is present in said circuit, said strobe pulse being related to said local system clock and being timed to be present during the time when said received data may be lost because of a transition coincidence with said local clock, said circuit output affecting a delay in said outgoing data.

3. A transition coincidence detection and compensation circuit as defined in claim 2 wherein the repetition rate of said strobe pulse is equal to or less than the system clock repetition rate divided by the maximum propogation delay in a loop circuit, between said central system device and said remote terminal including any resynchronisation delay in said remote terminal.

4. A transition coincidence detection and compensation circuit as defined in claim 3 wherein said circuit means responsive to said circuit is locked in position to delay said outgoing data when said detection occurs unless a further transition coincidence is detected, in which case the circuit means reverts to its original form whereby the outgoing data is not delayed.

5. A transition coincidence detection and compensation circuit as defined in claim 4 wherein said delay is effected by clocking the outgoing data with a clock signal which is 180° out of phase with the normal clock signal used to clock outgoing data.

6. A transition coincidence detection and compensation circuit as defined in claim 5 wherein said circuit comprises a +*ve* edge triggered flip-flop which is clocked by said received data, and an exclusive OR gate through which said strobe pulse is supplied to the data input of said flip-flop, the set output of the flip-flop providing said circuit output when said strobe pulse is present at the data input of the flip-flop during the time when said flip-flop is clocked by the data.

7. A transition coincidence detection and compensation circuit as defined in claim 6 wherein outgoing data is diphased data which is clocked through an outgoing ±*ve* edge triggered flip-flop at twice the normal data rate, the clock for said outgoing data being fed through a further exclusive OR gate and said circuit output being fed to said further OR gate to invert the clock for said outgoing data when said transition coincidence occurs.

8. A transition coincidence detection and compensation circuit as defined in claim 7 wherein said system is a synchronous digital telephone system, said central system device being the switch or exchange of the system and said remote terminal being one of the telephones of the system.

* * * * *